(12) United States Patent
Kulkarni et al.

(10) Patent No.: US 10,533,123 B2
(45) Date of Patent: Jan. 14, 2020

(54) ADDITIVE FOR IMPROVING HOMOGENEITY OF EPOXY RESIN AND CEMENT COMPOSITES

(71) Applicant: HALLIBURTON ENERGY SERVICES, INC., Houston, TX (US)

(72) Inventors: Mahesh P. Kulkarni, Pune (IN); Vandana N. Pandey, Pune (IN); Abhimanyu Pramod Deshpande, Pune (IN); Ganesh S. Pangu, Talegaon Dabhade (IN); Paul Joseph Jones, Humble, TX (US); Ronnie Morgan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/533,344

(22) PCT Filed: Jan. 5, 2015

(86) PCT No.: PCT/US2015/010170
§ 371 (c)(1),
(2) Date: Jun. 5, 2017

(87) PCT Pub. No.: WO2016/111674
PCT Pub. Date: Jul. 14, 2016

(65) Prior Publication Data
US 2017/0335168 A1 Nov. 23, 2017

(51) Int. Cl.
*C09K 8/467* (2006.01)
*E21B 33/13* (2006.01)
*C04B 28/02* (2006.01)

(52) U.S. Cl.
CPC .............. *C09K 8/467* (2013.01); *C04B 28/02* (2013.01)

(58) Field of Classification Search
CPC .......... C09K 8/46; C09K 8/467; C09K 8/473; C09K 8/48; C09K 8/487; C09K 8/493; C04B 28/02; E21B 33/13
(Continued)

(56) References Cited

U.S. PATENT DOCUMENTS

| 4,676,317 A * | 6/1987 | Fry .......................... C04B 24/18 106/719 |
| 6,234,251 B1 | 5/2001 | Chatterji et al. |

(Continued)

FOREIGN PATENT DOCUMENTS

| EP | 0245930 | 11/1987 |
| EP | 1028096 | 8/2000 |

(Continued)

OTHER PUBLICATIONS

PCT International Search Report and Written Opinion, dated Sep. 22, 2015 "Additive for Improving Homogeneity of Epdxy Resin and Cement Composites" filed Jan. 5, 2015.
(Continued)

*Primary Examiner* — Angela M DiTrani Leff
(74) *Attorney, Agent, or Firm* — Thomas Rooney; C. Tumey Law Group PLLC

(57) ABSTRACT

A method includes introducing a cementing composition into a subterranean formation, the cementing composition including a pumpable slurry of cement including an epoxy resin, an epoxy resin hardening agent, and a compatibilizer, where the compatibilizer is a lignite grafted copolymer; and allowing at least a portion of the cementing composition to harden. A composition includes a pumpable slurry of cement including an epoxy resin, an epoxy resin hardening agent, and a compatibilizer, where the compatibilizer is a lignite grafted copolymer.

16 Claims, 4 Drawing Sheets

(58) Field of Classification Search
USPC .................................. 166/292, 293, 294, 295
See application file for complete search history.

(56) References Cited

U.S. PATENT DOCUMENTS

| | | | |
|---|---|---|---|
| 6,244,344 B1* | 6/2001 | Chatterji | ................. C04B 24/18 |
| | | | 166/295 |
| 6,593,402 B2 | 7/2003 | Chatterji et al. | |
| 7,360,598 B1 | 4/2008 | Lewis et al. | |
| 7,388,045 B1* | 6/2008 | Lewis | ..................... C04B 28/02 |
| | | | 106/805 |
| 2001/0009133 A1 | 7/2001 | Chatterji et al. | |
| 2013/0255949 A1* | 10/2013 | Kellum | ................. C04B 24/163 |
| | | | 166/293 |
| 2016/0046853 A1* | 2/2016 | Chatterji | ................ C09K 8/426 |
| | | | 166/292 |

FOREIGN PATENT DOCUMENTS

| | | |
|---|---|---|
| WO | 2013/148976 | 10/2013 |
| WO | 2016024990 | 2/2016 |

OTHER PUBLICATIONS

First Examination report for Australian Patent Application No. 2015375553 dated Nov. 15, 2017.

\* cited by examiner

ADDITIVE FOR IMPROVING HOMOGENEITY OF EPOXY RESIN AND CEMENT COMPOSITES

BACKGROUND

Cementing is a common well operation. For example, hydraulic cement compositions can be used in cementing operations in which a string of pipe, such as casing or liner, is cemented in a wellbore. The cemented string of pipe isolates different zones of the wellbore from each other and from the surface. Hydraulic cement compositions can be used in primary cementing of the casing or in completion operations. Hydraulic cement compositions can also be utilized in intervention operations, such as in plugging highly permeable zones or fractures in zones that may be producing too much water, plugging cracks or holes in pipe strings, and the like.

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

The addition of epoxy resin to cement has been found to significantly improve the mechanical properties of the resulting composite material. However, at increased temperatures, epoxy resin and cement in liquid state may show phase separation, which leads to structural issues and rheological incompatibility.

Accordingly, an ongoing need exists for an epoxy resin cement with high temperature compatibility during the transition time of the cement composition, i.e., the time after the placement of a cement composition in the annulus during which the cement composition changes from a true fluid to a hard set mass.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
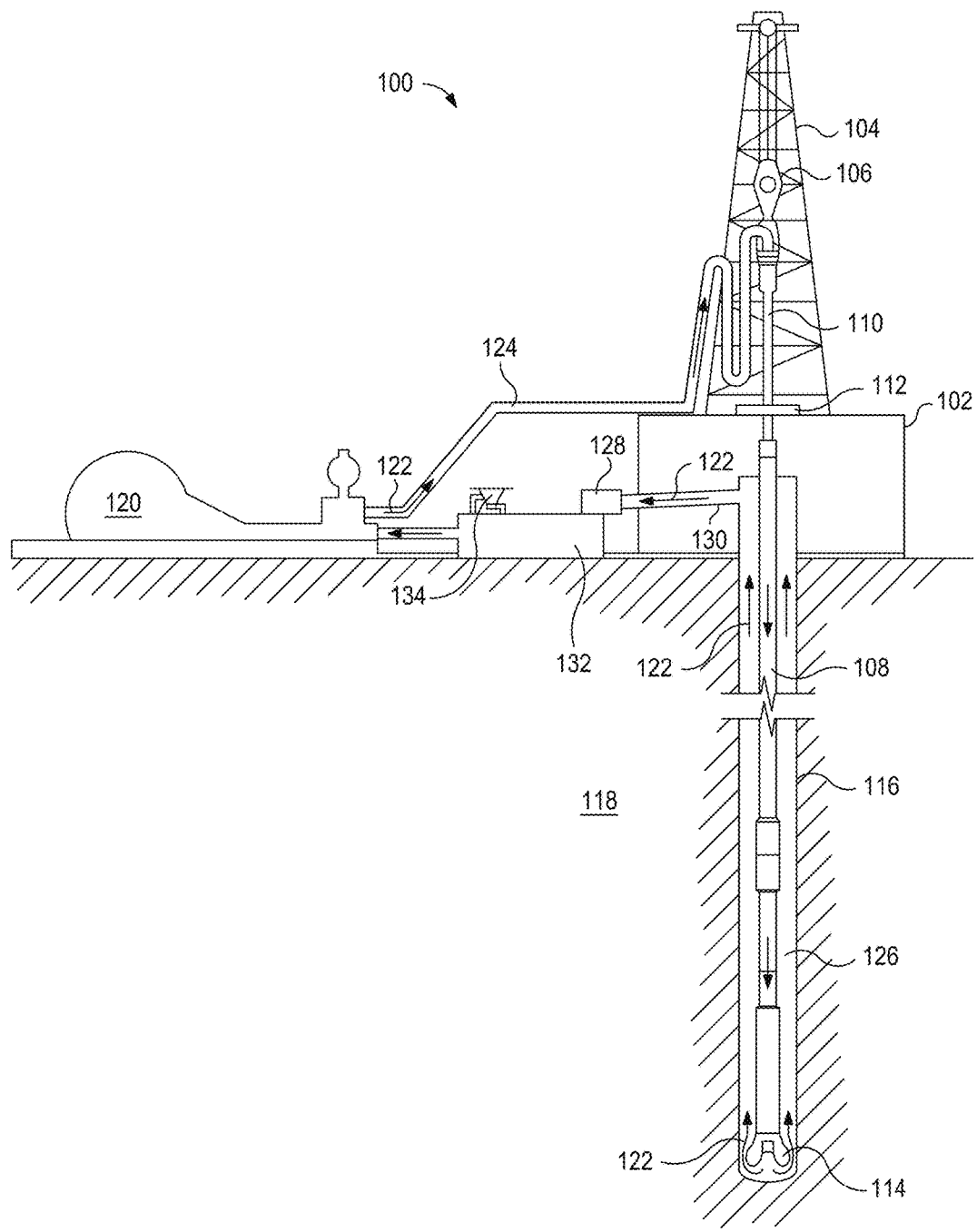
FIG. 1 depicts an embodiment of a system configured for delivering the cement/resins described herein to a downhole location.

The present invention relates to epoxy resin cement systems. In particular, the invention relates to epoxy resin cement systems which do not show phase separation if exposed to high temperatures during their transition time.

The addition of epoxy resin to cement may improve the mechanical properties of the resulting composite material. The epoxy resin addition to cement may reduce Young's modulus accompanied by an increase in compressive strength and Poisson's ratio, which may give good resiliency to a cement sheath. In addition, permeability may be significantly reduced with addition of epoxy resins. However, at high temperatures, epoxy resin and cement in liquid state may show phase separation, which may lead to severe rheological incompatibility. The addition of compatibility agents may avoid phase separation at high temperatures, even when the epoxy resin is the major component (up to 50%) of the epoxy resin and cement mixture.

In some embodiments, the invention is related to a method comprising: introducing a cementing composition into a subterranean formation, said cementing composition comprising: a pumpable slurry of cement including an epoxy resin, an epoxy resin hardening agent, and a compatibilizer, wherein the compatibilizer is a lignite grafted copolymer; and allowing at least a portion of the cementing composition to harden. In an exemplary embodiment, the lignite grafted copolymer may include monomers selected from the group consisting of 2-acrylamide-2-methylsulfonic acid, N,N-dimethylacrylamide, acrylonitrile, 2-acrylamide-2-methyl propane sulfonic acid, N-vinyl-N-methyl acetamide, 2-acrylamide-2-propane sulfonic acid, acrylonitrile-co-butadiene, 2-acrylamide-2-ethyl methyl sulfonic acid, acrylonitrile-co-methacrylate, and combinations thereof. In another embodiment, the lignite grafted copolymer may include at least one group selected from 2-acrylamide-2-methylsulfonic acid, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid, N,N-dimethylacrylamide, and acrylonitrile-co-butadiene; 2-acrylamide-2-ethyl methyl sulfonic acid, N,N-dimethylacrylamide, and acrylonitrile-co-methacrylate; and combinations thereof. The lignite grafted copolymer may also comprise 2-acrylamide-2-methylsulfonic acid, N,N-dimethylacrylamide, and acrylonitrile. An exemplary embodiment the lignite grafted copolymer comprises a water soluble copolymer. The water soluble copolymer may include N,N-dimethylacrylamide, and acrylonitrile. The compatibilizer may be present in the amount of about 0.3 gal/sack to about 0.6 gal/sack. The amount of epoxy resin present may be in the range of about 5% to about 50% by weight of pumpable cement in the composition. In an exemplary embodiment, the molar ratio of the copolymer 2-acrylamide-2-methylsulfonic acid, N,N-dimethylacrylamide, and acrylonitrile is about 3:3:1 respectively. In a further embodiment, the temperature of the cementing composition may be in the range of about 100° F. to about 180° F. In other embodiments, the temperature of the composition may be at least about 100° F., at least about 110° F., at least about 120° F., at least about 130° F., at least about 140° F., at least about 150° F., at least about 160° F., at least about 170° F., at least about 180° F.

Several embodiments of the invention are directed to a cementing system including an apparatus with a mixer and a pump configured to: place a cement composition in a wellbore, said cement composition comprising: a pumpable slurry of cement comprising an epoxy resin, an epoxy resin hardening agent, and a compatibilizer, wherein the compatibilizer is a lignite grafted copolymer. The lignite grafted copolymer may comprise at least one group selected from 2-acrylamide-2-methylsulfonic acid, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid and N,N-dimethyl acrylamide, and acrylonitrile-co-butadiene; 2-acrylamide-2-ethyl methyl sulfonic acid, N,N-dimethylacrylamide, and acrylonitrile-co-methacrylate; N,N-dimethylacrylamide, and acrylonitrile; and combinations thereof. The compatibilizer may be present in the amount of about 0.3 gal/sack to about 0.6 gal/sack. The amount of epoxy resin present may be in the range of about 5% to about 15% by weight of pumpable cement in the composition. In an exemplary embodiment, the molar ratio of the copolymer 2-acrylamide-2-methylsulfonic acid, N,N-dimethylacrylamide, and acrylonitrile is about 3:3:1 respectively. In a further embodiment, the temperature of the cementing composition may be in the range of about 100° F. to about 180° F. In other embodiments, the temperature of the composition may be: at least about 100° F.; at least about 110° F.; at least about 120° F.; at least about 130° F.; at least about 140° F.; at least about 150° F.; at least about 160° F.; at least about 170° F.; at least about 180° F.

Certain embodiments of the invention are directed to a composition for well cementing including an epoxy resin, an epoxy resin hardening agent, and a compatibilizer, wherein the compatibilizer is a lignite grafted copolymer. The lignite grafted copolymer may include at least one group of 2-acrylamide-2-methylsulfonic acid, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid N,N-dimethyl acrylamide, and acrylonitrile-co-butadiene; 2-acrylamide-2-ethyl methylsulfonic acid, N,N-dimethylacrylamide, and acrylonitrile-co-methacrylate; N,N-dimethylacrylamide, and acrylonitrile; and combinations thereof. The compatibilizer may be present in the amount of about 0.3 gal/sack to about 0.6 gal/sack. The amount of epoxy resin present may be in the range of about 5% to about 15% by weight of pumpable cement in the composition. In an exemplary embodiment, the molar ratio of the copolymer 2-acrylamide-2-methylsulfonic acid, N,N-dimethylacrylamide, and acrylonitrile is about 3:3:1 respectively. In a further embodiment, the temperature of the cementing composition may be in the range of about 100° F. to about 180° F. In other embodiments, the temperature of the composition may be: at least about 100° F.; at least about 110° F.; at least about 120° F.; at least about 130° F.; at least about 140° F.; at least about 150° F.; at least about 160° F.; at least about 170° F.; at least about 180° F.

Aqueous Base Fluids

The cement slurry may include an aqueous base fluid from any source, provided that the fluids do not contain components that might adversely affect the stability and/or performance of the treatment fluids of the present invention. The aqueous base fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In certain embodiments, the water may be present in the cement composition in an amount of from about 20% to about 95% by weight of cement composition, from about 28% to about 90% by wt. of cement composition, or from about 36% to about 80% by wt. of cement composition.

Cementitious Materials

A variety of cements can be used in the present invention, including cements comprised of calcium, aluminum, silicon, oxygen, and/or sulfur which set and harden by reaction with water. Such hydraulic cements include Portland cements, pozzolan cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III. The cementitious materials may be combined with the aqueous base fluids to form a cement slurry.

Slurry Density

In certain embodiments, the cement compositions have a slurry density which is pumpable for introduction down hole. In exemplary embodiments, the density of the cement composition in slurry form is from about 7 pounds per gallon (ppg) to about 20 ppg, from about 8 ppg to about 18 ppg, or from about 9 ppg to about 17 ppg.

Epoxy Resins

A variety of hardenable epoxy resins can be utilized in the cement compositions of this invention. Preferred epoxy resins are those selected from the condensation products of epichlorohydrin and bisphenol A. A particularly suitable such resin is commercially available from the Shell Chemical Company under the trade designation "EPON® RESIN 828." This epoxy resin has a molecular weight of about 340 and a one gram equivalent of epoxide per about 180 to about 195 grams of resin. Another suitable epoxy resin is an epoxidized bisphenol A novolac resin which has a one gram equivalent of epoxide per about 205 grams of resin.

The WellLock™ System includes resins useful in the invention. WellLock™ R1 epoxy resin contains a butyl glycidyl ether. WellLock™ R2 resin contains a cyclohexanedimethanol diglydicyl ether. WellLock™ H1 epoxy resin curing agent contains diethyltoluenediamine. A blend of WellLock™ R1 and R2 resins may be cured using WellLock™ H1 curing agent. The WellLock™ System is available from Halliburton Energy Services, Inc., Houston, Tex.

The epoxy resin utilized is preferably included in the cement compositions of this invention in an amount in the range of from about 5% to about 50% by weight of hydraulic cement in the compositions. In another embodiment, the epoxy resin is present in an amount in the range of from about 5% to about 15% by weight of hydraulic cement in the compositions.

Epoxy Resin Hardeners

A variety of hardening agents, including, but not limited to, aliphatic amines, aliphatic tertiary amines, aromatic amines, cycloaliphatic amines, heterocyclic amines, amidoamines, polyamides, polyethyleneamines and carboxylic acid anhydrides can be utilized in the compositions of this invention containing the above described epoxy resins.

Examples of aliphatic and aromatic amine hardening agents are triethylenetetraamine, ethylenediamine, N-cocoalkyltrimethylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride.

As mentioned above, WellLock™ H1 epoxy resin curing agent contains diethyltoluenediamine and may be used with the resins in the WellLock™ System.

The hardening agent or agents utilized are preferably included in the cement compositions of this invention in an amount in the range of from about 10% to about 30% by weight of epoxy resin in the compositions (from about 1% to about 3% by weight of hydraulic cement in the compositions).

Compatibilizers

The invention includes a compatibilizer including a graft polymer that comprises a lignite backbone grafted with copolymers including monomers selected from the group consisting of 2-acrylamide-2-methylsulfonic acid, N,N-dimethylacrylamide, acrylonitrile, 2-acrylamide-2-methyl propane sulfonic acid, N-vinyl-N-methyl acetamide, 2-acrylamide-2-propane sulfonic acid, acrylonitrile-co-butadiene, 2-acrylamide-2-ethyl methylsulfonic acid, acrylonitrile-co-methacrylate, and combinations thereof.

Generally, the backbone of the graft polymer comprises a lignite. As used in this disclosure, the term "lignite" refers to a variety of low rank coals, including oxidized lignite (e.g., leonardite), mined lignin, brown coal or slack. In addition, in exemplary embodiments, the backbone may further comprise polyvinyl alcohol, polyethylene oxide, polypropylene oxide, polyethyleneimine and combinations thereof. Those of ordinary skill in the art will appreciate that the lignite may be treated with a caustic (for example, potassium hydroxide, sodium hydroxide or ammonium hydroxide) to solubilize the lignite in water. By way of example, treatment of the lignite with a caustic solution generally may dissolve or disperse a portion of the lignite into the solution. Such solution may then be concentrated to increase the lignite content or may be used directly in the polymerization.

Those of ordinary skill in the art will appreciate that suitable graft polymers may be in an acid form or in a salt form.

Exemplary blends of copolymers may include 2-acrylamide-2-methylsulfonic acid, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid, N,N-dimethyl acrylamide, and acrylonitrile-co-butadiene; 2-acryl amide-2-ethyl methylsulfonic acid, N,N-dimethylacrylamide, and acrylonitrile-co-methacrylate; N,N-dimethylacrylamide, and acrylonitrile; and combinations thereof.

Formula 1 illustrates a preferred blend of copolymer including 2-acrylamide-2-methylsulfonic acid, N,N-dimethylacrylamide, and acrylonitrile. In some embodiments, this blend has a molar ratio of 3:3:1 respectively, (x=3, y=3, z=1) One of skill in the art will realize that x, y, and z may be altered to achieve different compounds based on a number of factors, including cost, the temperature of use, and the desired molecular weight of the graft copolymer, to name a few.

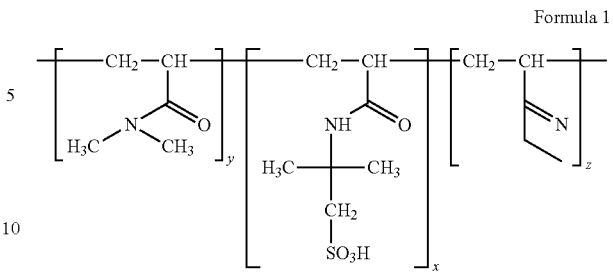

Formula 1

In some embodiments, a water soluble copolymer may be desired. One example is to combine N,N-dimethylacrylamide, and acrylonitrile moieties.

A commercially available compatibilizer is HALAD™-413L additive, from Halliburton Energy Services, Inc., Houston, Tex. This compound is a lignite grafted copolymer of 2-acrylamide-2-methylsulfonic acid, N,N-dimethylacrylamide, and acrylonitrile.

The compatibilizers in the invention may be included in an amount in the range of from about 0.3 gal/sack to about 0.6 gal/sack.

In some embodiments, the compatibilizers may be useful at a temperature of the cementing composition in the range of about 100° F. to about 180° F. In other embodiments, the temperature of the composition may be: at least about 100° F.; at least about 110° F.; at least about 120° F.; at least about 130° F.; at least about 140° F.; at least about 150° F.; at least about 160° F.; at least about 170° F.; at least about 180° F.

Cement Additives

The cement compositions of the invention may contain additives. In certain embodiments, the additives comprise at least one of latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, formation conditioning agents, and combinations thereof.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

As will be appreciated by those of ordinary skill in the art, embodiments of the cement compositions of the present invention may be used in a variety of subterranean applications, including primary and remedial cementing. For example, a cement slurry composition comprising cement, a polymer, and water may be introduced into a subterranean formation and allowed to set or cure therein. In certain embodiments, for example, the cement slurry composition may be introduced into a space between a subterranean formation and a pipe string located in the subterranean formation. Embodiments may further comprise running the pipe string into a wellbore penetrating the subterranean formation. The cement slurry composition may be allowed to set or cure to form a hardened mass in the space between the subterranean formation and the pipe string. In addition, a cement composition may be used, for example, in squeeze-cementing operations or in the placement of cement plugs. Embodiments of the present invention further may comprise producing one or more hydrocarbons (e.g., oil, gas, etc.) from a well bore penetrating the subterranean formation.

The exemplary cement compositions disclosed herein may directly or indirectly affect one or more components or pieces of equipment associated with the preparation, delivery, recapture, recycling, reuse, and/or disposal of the disclosed cement compositions. For example, and with reference to FIG. 1, the disclosed cement compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed cement compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed cement compositions may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed cement compositions may be stored, reconditioned, and/or regulated until added to the drilling fluid 122.

As mentioned above, the disclosed cement compositions may directly or indirectly affect the components and equipment of the drilling assembly 100. For example, the disclosed cement compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary cement compositions.

The disclosed cement compositions may directly or indirectly affect the pump 120, which representatively includes any conduits, pipelines, trucks, tubulars, and/or pipes used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The disclosed cement compositions may also directly or indirectly affect the mixing hopper 134 and the retention pit 132 and their assorted variations.

The disclosed cement compositions may also directly or indirectly affect the various downhole equipment and tools that may come into contact with the cement compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed cement compositions may also directly or indirectly affect any downhole heat exchangers, valves and corresponding actuation devices, tool seals, packers and other wellbore isolation devices or components, and the like associated with the wellbore 116. The disclosed cement compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed cement compositions may also directly or indirectly affect any transport or delivery equipment used to convey the cement compositions to the drilling assembly 100 such as, for example, any transport vessels, conduits, pipelines, trucks, tubulars, and/or pipes used to fluidically move the cement compositions from one location to another, any pumps, compressors, or motors used to drive the cement compositions into motion, any valves or related joints used to regulate the pressure or flow rate of the cement compositions, and any sensors (i.e., pressure and temperature), gauges, and/or combinations thereof, and the like.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Cement/Resin Preparation

The influence of a compatibilizer was studied by measuring rheology, mechanical properties, and density variation of resin-cement mixtures in different ratios. The mixtures were conditioned for 20 minutes at 140° F. and then cured at 140° F. for the evaluation of mechanical properties and density variation. Mechanical properties study consists of compressive strength and Young's modulus. In addition the rheologies of this system were investigated and the results are summarized below.

In an exemplary embodiment, the compatibilizer in this study is a lignite grafted copolymer of 2-acrylamide-2-methylsulfonic acid, N,N-dimethylacrylamide, and acrylonitrile. This compatibilizer is available commercially as HALAD™-413L, from Halliburton Energy Services, Inc., Houston, Tex.

WellLock™ System resin (9.19 ppg) and a cement slurry (15.8 ppg) were prepared with compositions given below. WellLock™ R1 epoxy resin contains butyl glycidyl ether. WellLock™ R2 resin contains a cyclohexanedimethanol diglydicyl ether. WellLock™ H1 epoxy resin curing agent contains diethyltoluenediamine. The WellLock™ System is available from Halliburton Energy Services, Inc., Houston, Tex.

| (i) Composition of Epoxy Resin | |
|---|---|
| WellLock ™ R1 resin | 100.00% bwc |
| WellLock ™ R2 resin | 33.30% bwc |
| WellLock ™ H1 curing agent | 38.50% bwc |

| (ii) Composition of Cement Slurry | |
|---|---|
| Class G Cement | 100.00% bwc |
| Water | 42.00% bwc |
| Compatibilizer | 0.40 gal/sk |

Test 1:
Test Results of WellLock™ System at 140° F.

TABLE 1

Rheology readings of cement-resin composites with compatibilizer using Fann 35(FYSA) Viscometer

| Rheology Properties (RPM) | Cement/Resin (Ratio) | | | | |
|---|---|---|---|---|---|
| | 100% Cement | 95/05 | 75/25 | 50/50 | 100% Resin |
| 600 | 78 | 86 | 110 | 125 | 37 |
| 300 | 46 | 65 | 76 | 96 | 13 |
| 200 | 39 | 55 | 65 | 86 | 8 |
| 100 | 31 | 48 | 51 | 69 | 4 |
| 60 | 28 | 44 | 43 | 59 | 3 |
| 30 | 24 | 42 | 35 | 47 | 2 |
| 6 | 18 | 40 | 21 | 30 | 1 |
| 3 | 16 | 35 | 17 | 25 | 1 |
| K1 = 0.289, K2 = 0.728 | | | | | |

TABLE 2

Rheology readings of cement-resin composites without compatibilizer using Fann 35(FYSA) Viscometer

| Rheology Properties (RPM) | Cement/Resin (Ratio) | | | | |
|---|---|---|---|---|---|
| | 100% Cement | 95/05 | 75/25 | 50/50 | 100% Resin |
| 600 | 104 | 105 | Phase separation | Phase separation | 37 |
| 300 | 72 | 71 | | | 13 |
| 200 | 64 | 61 | | | 8 |
| 100 | 55 | 51 | | | 4 |
| 60 | 46 | 44 | | | 3 |
| 30 | 42 | 39 | | | 2 |
| 6 | 36 | 33 | | | 1 |
| 3 | 33 | 30 | | | 1 |
| K1 = 0.289, K2 = 0.728 | | | | | |

Test 2:

TABLE 3

Density readings of cement-resin composites with compatibilizer

| Unit | 100% CMT | 95/05 | 75/25 | 50/50 | 100% Resin |
|---|---|---|---|---|---|
| Top | 15.67 | 14.64 | 14.09 | 12.56 | 9.64 |
| | 15.73 | 14.69 | 14.10 | 12.57 | 9.64 |
| Middle | 15.78 | 14.73 | 14.14 | 12.62 | 9.62 |
| | 15.82 | 14.77 | 14.18 | 12.64 | 9.64 |
| Bottom | 15.86 | 14.82 | 14.38 | 12.69 | 9.64 |

TABLE 4

Density readings of cement-resin composites without compatibilizer

| Unit | 100% CMT | 95/05 | 75/25* | 50/50* | 100% Resin |
|---|---|---|---|---|---|
| Top | 15.72 | 14.59 | 12.70 | 10.56 | 9.64 |
| | 15.73 | 14.61 | 13.10 | 12.19 | 9.64 |
| Middle | 15.73 | 14.64 | 13.14 | 12.62 | 9.63 |
| | 15.78 | 14.70 | 13.98 | 13.34 | 9.64 |
| Bottom | 15.82 | 14.71 | 14.11 | 13.69 | 9.64 |

*Phase separation (Exhibits two layers)

Test 3:

TABLE 5

Mechanical properties of cement-resin composites with and without compatibilizer

| Cement/Resin (Ratio) | 100% CMT | 95/05 | 75/25 | 50/50 | 100% WLR |
|---|---|---|---|---|---|
| 7 Days Compressive strength (psi) with Compatibilizer | 5310 | 6270 | 5056 | 4770 | 13600 |
| 7 Days Compressive strength (psi) without Compatibilizer | 4290 | 4220 | 4480 | 4060 | 13600 |
| 7 Days Young's Modulus (Mpsi) with Compatibilizer | 1.39 | 1.09 | 0.94 | 0.47 | 0.46 |
| 7 Days Young's Modulus (Mpsi) without Compatibilizer | 1.59 | 1.46 | 1.16 | 0.65 | 0.46 |

Figure 2A:
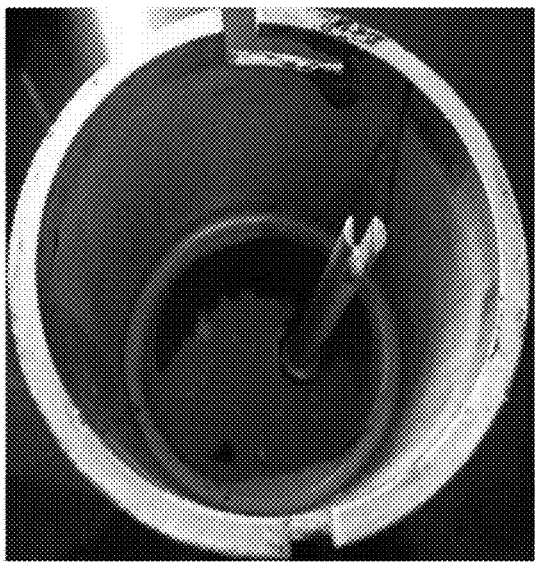
FIGS. 2A-D are photographs of a cement/resin mixture according to the prior art.
Figure 2B:
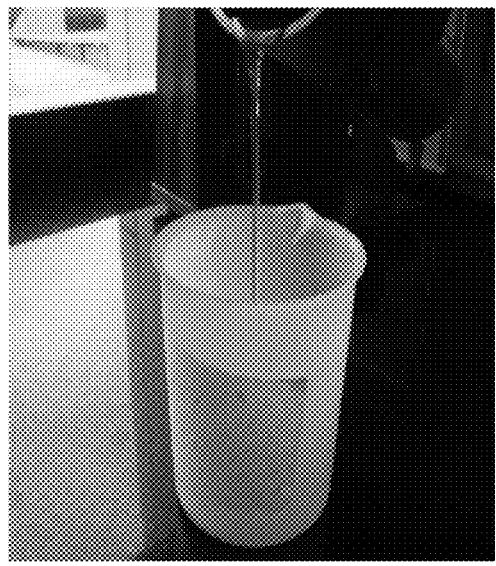

FIGS. 2A-D show phase separation after conditioning of the cement/resin mixture without a compatibilizer after conditioning at 140° F. for 20 minutes (cement/resin: 50/50). FIG. 2A shows that after mixing, there are separate phases.

Figure 2C:
Figure 2D:
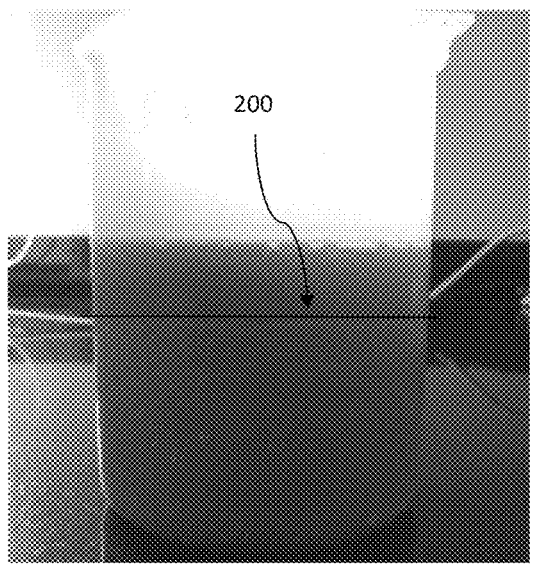

First, the resin phase is poured off (FIG. 2B), followed by the cement phase (FIG. 2C). The boundary between both phases 200 is shown in FIG. 2D.

Figure 3A:
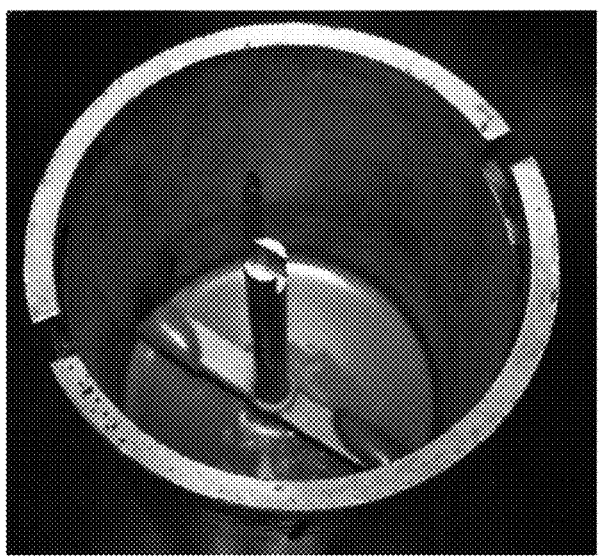
FIGS. 3A-C are photographs of a cement/resin mixture according to embodiments of the invention.
Figure 3B:
Figure 3C:

By contrast, FIGS. 3A-C demonstrate the homogeneity after conditioning of the cement/resin mixture with a compatibilizer at 140° F. for 20 minutes (cement/resin: 50/50). FIG. 3A demonstrates that immediately after mixing, there is no phase separation. Next, the single phase composition is poured off (FIG. 3B) with the final result shown in FIG. 3C.

Figure 4:
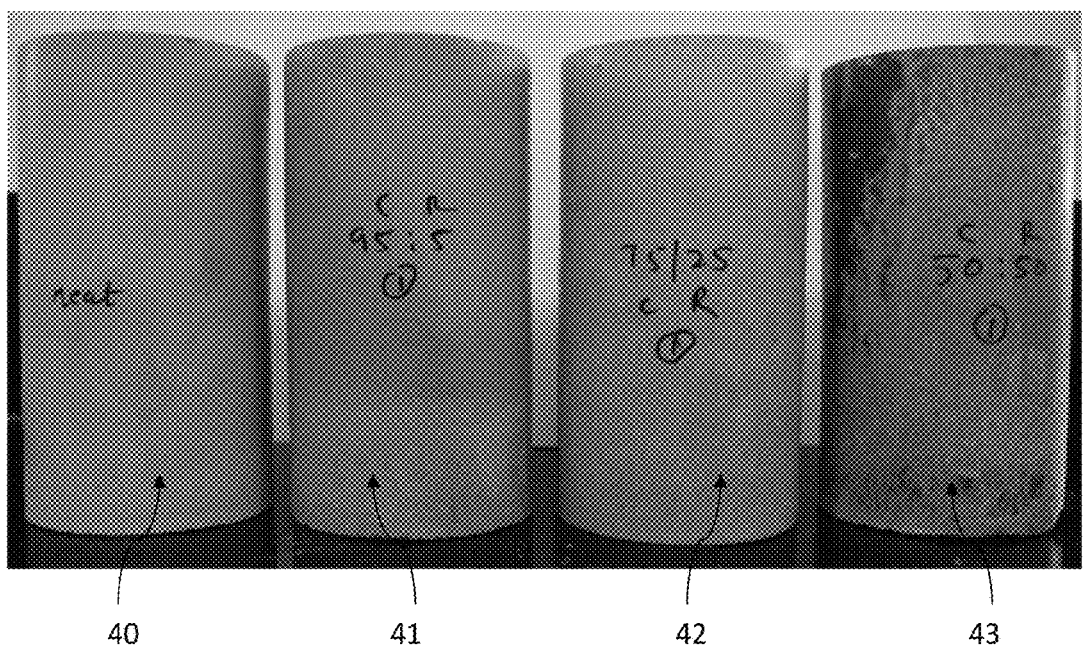
FIG. 4 is a photograph of cured cement/resin mixtures according to embodiments of the invention.

FIG. 4 shows resin/cement/compatibilizer mixtures that were conditioned at 140° F. for 20 minutes and then allowed to cure at 140° F. The results show that the mixtures comprising a wide ratio of cement/resin amounts exhibit single layers. The ratios of cement to resin demonstrated are 100:0 (40), 95:5 (41), 75:25 (42), and 50:50 (43).

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method comprising: introducing a cementing composition in a subterranean formation, said cementing composition comprising: a pumpable slurry of cement including an epoxy resin, an epoxy resin hardening agent, and a compatibilizer, wherein the compatibilizer is a lignite grafted copolymer; and allowing at least a portion of the cementing composition to harden.

B: A cementing system comprising: an apparatus including a mixer and a pump configured to: place a cement composition in a wellbore, said cement composition comprising: a pumpable slurry of cement comprising an epoxy resin, an epoxy resin hardening agent, and a compatibilizer, wherein the compatibilizer is a lignite grafted copolymer.

C: A composition for well cementing comprising: a pumpable slurry of cement comprising an epoxy resin, an epoxy resin hardening agent, and a compatibilizer, wherein the compatibilizer is a lignite grafted copolymer.

Each of embodiments A, B and C may have one or more of the following additional elements in any combination: Element 1: wherein the lignite grafted copolymer includes monomers selected from the group consisting of 2-acrylamide-2-methylsulfonic acid, N,N-dimethylacrylamide, acrylonitrile, 2-acrylamide-2-methyl propane sulfonic acid, N-vinyl-N-methyl acetamide, 2-acrylamide-2-propane sulfonic acid, acrylonitrile-co-butadiene, 2-acrylamide-2-ethyl methylsulfonic acid, acrylonitrile-co-methacrylate, and combinations thereof. Element 2: wherein the lignite grafted copolymer comprises at least one group selected from 2-acrylamide-2-methylsulfonic acid, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid, N,N-dimethylacrylamide, and acrylonitrile-co-butadiene; 2-acrylamide-2-ethyl methylsulfonic acid, N,N-dimethylacrylamide, and acrylonitrile-co-methacrylate; and combinations thereof. Element 3: wherein the lignite grafted copolymer comprises 2-acrylamide-2-methylsulfonic acid, N,N-dimethylacrylamide, and acrylonitrile. Element 4: wherein the lignite grafted copolymer comprises a water soluble copolymer. Element 5: The method of claim 5, wherein the lignite grafted copolymer comprises N,N-dimethylacrylamide, and acrylonitrile. Element 6: wherein the compatibilizer is present in the amount of about 0.3 gal/sack to about 0.6 gal/sack. Element 7: wherein the molar ratio of 2-acrylamide-2-methylsulfonic acid, N,N-dimethylacrylamide, and acrylonitrile is about 3:3:1 respectively. Element 8: wherein the amount of epoxy resin present is in the range of about 5% to about 50% by weight of pumpable cement in the composition. Element 9: wherein the amount of epoxy resin hardening agent present is in the range of about 10% to about 30% by weight of the epoxy resin in the cementing composition. Element 10: wherein the amount of epoxy resin present is in the range of about 5% to about 15% by weight of pumpable cement in the composition. Element 11: wherein the temperature of the cementing composition is in the range of about 100° F. to about 180° F. Element 12: wherein the temperature of the cementing composition may be at least about 100° F. Element 13: wherein the temperature of the cementing composition may be at least about 110° F. Element 14: wherein the temperature of the cementing composition may be at least about 120° F. Element 15: wherein the temperature of the cementing composition may be at least about 130° F. Element 16: wherein the temperature of the cementing composition may be at least about 140° F. Element 17: wherein the temperature of the cementing composition may be at least about 150° F. Element 18: wherein the temperature of the cementing composition may be at least about 160° F. Element 19: wherein the temperature of the cementing composition may be at least about 170° F. Element 20: wherein the temperature of the cementing composition may be at least about 180° F. Element 21: wherein the cementing composition is introduced in the annulus between a pipe and the walls of a wellbore.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

The invention claimed is:

1. A method comprising:
   introducing a cementing composition into a subterranean formation, said cementing composition comprising:
   a pumpable slurry comprising:
   a cement;
   an epoxy resin present in an amount of 25% to about 50% by weight of the cement;
   an epoxy resin hardening agent; and
   a compatibilizer, wherein the compatibilizer is a lignite grafted copolymer; and
   allowing at least a portion of the cementing composition to harden at a temperature in a range of from 100° F. to 180° F., wherein the compatibilizer reduces phase separation between the cement and the epoxy resin at elevated temperatures of 100° F. to 180° F., wherein the lignite grafted copolymer comprises 2-acrylamide-2-methylsulfonic acid, wherein the cementing composition has a 7-day compressive strength of about 5056 or less.

2. The method of claim 1, wherein the lignite grafted copolymer further includes monomers selected from the group consisting of, N,N-dimethylacrylamide, acrylonitrile, 2-acrylamide-2-methyl propane sulfonic acid, N-vinyl-N-methyl acetamide, 2-acrylamide-2-propane sulfonic acid, acrylonitrile-co-butadiene, 2-acrylamide-2-ethyl methylsulfonic acid, acrylonitrile-co-methacrylate, and combinations thereof.

3. The method of claim 1, wherein the lignite grafted copolymer further comprises at least one group selected from, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid, N,N-dimethylacrylamide, and acrylonitrile-co-butadiene; 2-acrylamide-2-ethyl methyl sulfonic acid, N,N-dimethylacrylamide, and acrylonitrile-co-methacrylate; and combinations thereof.

4. The method of claim 3, wherein the lignite grafted copolymer further comprises N,N-dimethylacrylamide and acrylonitrile.

5. The method of claim 4, wherein the molar ratio of 2-acrylamide-2-methylsulfonic acid, N,N-dimethylacrylamide, and acrylonitrile is about 3:3:1 respectively.

6. The method of claim 1, wherein the lignite grafted copolymer comprises a water soluble copolymer.

7. The method of claim 6, wherein the lignite grafted copolymer further comprises N,N-dimethylacrylamide and acrylonitrile.

8. The method of claim 1, wherein the compatibilizer is present in the amount of about 0.3 gal/sack to about 0.6 gal/sack.

9. A cementing system comprising:
an apparatus including a mixer and a pump configured to:
place a cement composition in a wellbore, said cement composition comprising:
a pumpable slurry comprising a cement, an epoxy resin present in an amount of 25% to about 50% by weight of the cement, an epoxy resin hardening agent, and a compatibilizer, wherein the compatibilizer is a lignite grafted copolymer, wherein the lignite grafted copolymer comprises 2-acrylamide-2-methylsulfonic acid, wherein the compatibilizer reduces phase separation between the cement and the epoxy resin at elevated temperatures of 100° F. to 180° F., wherein the cement composition has a 7-day compressive strength of about 5056 or less.

10. The system of claim 9, wherein the lignite grafted copolymer further comprises at least one group selected from N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid, N,N-dimethylacrylamide, and acrylonitrile-co-butadiene; 2-acrylamide-2-ethyl methylsulfonic acid, N,N-dimethylacrylamide, and acrylonitrile-co-methacrylate; N,N-dimethylacrylamide, and acrylonitrile; and combinations thereof.

11. The system of claim 10, wherein the molar ratio of 2-acryamide-2-methylsulfonic acid, N,N-dimethylacrylamide, and acrylonitrile is about 3:3:1 respectively.

12. The system of claim 9, wherein the compatibilizer is present in the amount of about 0.3 gal/sack to about 0.6 gal/sack.

13. A composition for well cementing comprising:
a pumpable slurry comprising a cement, an epoxy resin present in an amount of 25% to about 50% by weight of the cement, an epoxy resin hardening agent, and a compatibilizer, wherein the compatibilizer is a lignite grafted copolymer, wherein the lignite grafted copolymer comprises 2-acrylamide-2-methylsulfonic acid, wherein the compatibilizer reduces phase separation between the cement and the epoxy resin at elevated temperatures of 100° F. to 180° F., wherein the cementing composition has a 7-day compressive strength of about 5056 or less.

14. The composition of claim 13, wherein the lignite grafted copolymer further comprises at least one group selected from, N,N-dimethylacrylamide, and acrylonitrile; 2-acrylamide-2-methyl propane sulfonic acid, N-vinyl-N-methyl acetamide, and acrylonitrile; 2-acrylamide-2-propane sulfonic acid, N,N-dimethylacrylamide, and acrylonitrile-co-butadiene; 2-acrylamide-2-ethyl methylsulfonic acid, N,N-dimethylacrylamide, and acrylonitrile-co-methacrylate; N,N-dimethylacrylamide, and acrylonitrile; and combinations thereof.

15. The composition of claim 14, wherein the molar ratio of 2-acrylamide-2-methylsulfonic acid, N,N-dimethylacrylamide, and acrylonitrile is about 3:3:1 respectively.

16. The composition of claim 13, wherein the compatibilizer is present in the amount of about 0.3 gal/sack to about 0.6 gal/sack.

* * * * *